(12) United States Patent
Bonneville et al.

(10) Patent No.: US 12,096,293 B2
(45) Date of Patent: Sep. 17, 2024

(54) SWITCHING A SIDELINK FROM A SOURCE CELL TO A TARGET CELL USING A FALLBACK LINK

(71) Applicant: MITSUBISHI ELECTRIC CORPORATION, Tokyo (JP)

(72) Inventors: Herve Bonneville, Rennes (FR); Nicolas Gresset, Rennes (FR); Mourad Khanfouci, Rennes (FR); Cristina Ciochina, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 366 days.

(21) Appl. No.: 17/641,978

(22) PCT Filed: Oct. 16, 2020

(86) PCT No.: PCT/JP2020/039806
§ 371 (c)(1),
(2) Date: Mar. 10, 2022

(87) PCT Pub. No.: WO2021/085314
PCT Pub. Date: May 6, 2021

(65) Prior Publication Data
US 2022/0386198 A1  Dec. 1, 2022

(30) Foreign Application Priority Data
Oct. 31, 2019 (EP) .................................. 19306414

(51) Int. Cl.
*H04W 4/46* (2018.01)
*H04W 36/00* (2009.01)
*H04W 36/32* (2009.01)

(52) U.S. Cl.
CPC ..... *H04W 36/03* (2018.08); *H04W 36/00837* (2018.08); *H04W 36/32* (2013.01)

(58) Field of Classification Search
CPC ........................ H04W 36/03; H04W 36/00837
See application file for complete search history.

(56) References Cited

U.S. PATENT DOCUMENTS

2018/0227821 A1\* 8/2018 Tsai .................. H04W 36/0009
2020/0092685 A1   3/2020 Fehrenbach et al.
(Continued)

FOREIGN PATENT DOCUMENTS

WO    WO 2018/202798 A1   11/2018

OTHER PUBLICATIONS

International Search Report (PCT/ISA/210) issued in PCT/JP2020/039806, dated Jan. 28, 2021.
(Continued)

Primary Examiner — Dai Phuong
(74) Attorney, Agent, or Firm — Birch, Stewart, Kolasch & Birch, LLP

(57) ABSTRACT

Examples include a method for operating a specific mobile device moving from a source cell to a destination cell. The method comprises using a source sidelink managed by a source base station, whereby the specific and following mobile devices are located within the source cell. The method also comprises switching from the source sidelink to a fallback link, the fallback link resources being managed independently from any base station. The method further comprises switching from the fallback link to a destination sidelink managed by a destination base station, whereby the specific device and the following device are located within the destination cell.

15 Claims, 11 Drawing Sheets

(56) References Cited

U.S. PATENT DOCUMENTS

| | | | | |
|---|---|---|---|---|
| 2021/0022055 A1* | 1/2021 | Tseng | .................... | H04W 76/27 |
| 2021/0258853 A1* | 8/2021 | Wang | .................... | H04W 36/22 |
| 2021/0409990 A1* | 12/2021 | Wang | .................... | H04W 24/08 |
| 2022/0201716 A1* | 6/2022 | Yi | ...................... | H04W 72/0453 |
| 2022/0394677 A1* | 12/2022 | Wu | ....................... | H04W 72/02 |

OTHER PUBLICATIONS

Written Opinion of the International Searching Authority (PCT/ISA/237) issued in PCT/JP2020/039806, dated Jan. 28, 2021.

\* cited by examiner

SWITCHING A SIDELINK FROM A SOURCE CELL TO A TARGET CELL USING A FALLBACK LINK

TECHNICAL FIELD

The invention relates to a method for operating a specific mobile device moving from a source cell to a destination cell, and a specific mobile device configured to operate according to the method and a computer-readable storage medium comprising instructions to carry out the method.

BACKGROUND ART

A mobile device in communication with a base station covering a cell may be handed over to another base station covering another cell as such devices moves from one cell to another. Such transition from one cell to another can give rise to a discontinuity in the communication process.

SUMMARY OF INVENTION

The invention is defined by the appended independent claims. Additional features and advantages of the concepts herein disclosed are set forth in the description which follows.

The present disclosure describes a method for operating a specific mobile device moving from a source cell to a destination cell, the method comprising:
  using, by the specific mobile device, a source sidelink to exchange signals with a following mobile device, source sidelink resources being managed by a source base station operating the source cell, whereby the specific and following mobile devices are located within the source cell;
  switching, by the specific mobile device, from the source sidelink to a fallback link to exchange signals with the following mobile device, the fallback link resources being managed independently from any base station;
  switching, by the specific mobile device, from the fallback link to a destination sidelink to exchange signals with the following mobile device, destination sidelink resources being managed by a destination base station operating the destination cell, whereby the specific device and the following device are located within the destination cell.

Such a method permits for example maintaining a vehicle to vehicle communication in a vehicle platoon as the vehicles move from a cell corresponding to a source base station to a cell corresponding to a different destination base station. In case of the platoon spreading across cells corresponding to both the source and destination base stations, some vehicles or mobile devices are for example connected using a sidelink within one of the base stations when they are located in a cell corresponding to the same base station, the sidelink being for example using radio resources allocated dynamically by the corresponding base station ('mode 1') and being incompatible between the source and destination base station, while vehicles in the transition area between source and destination base station communicate using the fallback link managed independently from any base station.

Optionally, the method further comprises:
  using, by the specific mobile device, the source sidelink to exchange signals with a preceding mobile device, whereby the specific and preceding mobile devices are located within the source cell;
  switching, by the specific mobile device, from the source sidelink to the fallback link to exchange signals with the preceding mobile device while maintaining the source sidelink to exchange signals with the following mobile device;
  switching, by the specific mobile device, from the fallback link to the destination sidelink to exchange signals with the preceding mobile device while maintaining the fallback link to exchange signals with the following mobile device.

Indeed, in some examples, a following vehicle is in a cell depending from the source base station while, at the same time, a preceding vehicle is in a cell depending from the destination base station, the specific mobile device transitioning at that same time from one cell to another, such cells respectively corresponding to the source and to the destination base station. The method avoids breaking a vehicle to vehicle (V2V) communication in such cases.

Optionally, the specific mobile device is one of a plurality of mobile devices forming a platoon, whereby the method is applied successively to different mobile devices as such different mobile devices follow each other as the platoon moves from the source cell to the destination cell. The method is indeed particularly of use to platoons which may spread cells handled by different base stations, and permit for example increasing the efficiency and reliability of V2V communications in such contexts.

Optionally, the switching, by the specific mobile device, from the source sidelink to the fallback link to exchange signals with the following mobile device, comprises the specific mobile device sending a switching message to the following mobile device. Such messaging between mobile devices permits for example reducing messaging traffic at a base station level.

Optionally, the switching, by the specific mobile device, from the source sidelink to the fallback link to exchange signals with the following mobile device is triggered by the specific mobile device receiving a handover command originating from the source base station. Proceeding in this manner permits for example proceeding with the switching when a transition from a base station to another is about to take place, whereby such transition would impact an established sidelink communication.

Optionally, the switching, by the specific mobile device, from the source sidelink to the fallback link to exchange signals with the following mobile device is triggered by the specific mobile device measuring a signal or signal quality. Proceeding in this manner permits for example proceeding with the switching when the specific mobile device is reaching an area where messaging from the source base station has weakened, such area corresponding to the specific mobile device exiting the corresponding cell.

Optionally, the switching, by the specific mobile device, from the source sidelink to the fallback link to exchange signals with the following mobile device comprises the specific mobile device receiving a command originating from an application server. Such application servers may indeed benefit from information permitting detecting that the specific mobile device is about to transition from the source to the destination cell.

Optionally, the switching, by the specific mobile device, from the source sidelink to the fallback link to exchange signals with the following mobile device, comprises the specific mobile device receiving a signal originating from an application server based on a geographical location of the specific mobile device. Such application servers may indeed manage location information from the specific vehicle as well as a network topology permitting detecting that the specific mobile device is about to transition from the source to the destination cell.

Optionally, the switching, by the specific mobile device, from the source sidelink to the fallback link to exchange signals with the following mobile device, comprises the specific mobile device receiving a switching command originating from the source base station. This permits for example proceeding with the switching when the base station is about to proceed with handover, whereby such handover would impact sidelink communication.

Optionally, the specific mobile device exchanges, with the following mobile device, signals to check if the specific mobile device and the following mobile device are served by a same base station. This could for example be used to delay a trigger to fallback link if a change of cells would take place between cells handled by a same base station which would permit maintaining a same sidelink in place.

Optionally, the method comprises, prior to the switching by the specific mobile device from the source sidelink to the fallback link, sending, by the specific mobile device and to the source base station, a signal indicating fallback link scheduling constraints. This permits for example taking the transition from sidelink to fallback link into account at the base station level and reducing potential communication issues.

Optionally, the switching, by the specific mobile device, from the source sidelink to the fallback link to exchange signals with the following mobile device, is preceded by a fallback link preparation step, the fallback link preparation step comprising sending a fallback link preparation message from the specific mobile device to the following mobile device, the fallback preparation message comprising fallback link configuration information. This permits, for example, reducing the amount of time during which the fallback link would be used, thereby reducing fallback link resources requirements.

Optionally, the specific mobile device periodically proceeds with checking the availability of a fallback link resource. This increased awareness for example permits increasing readiness to switch to a fallback link.

The present disclosure also describes a computer-readable storage medium comprising instructions which, when executed by a processor of a specific mobile device, cause the processor to carry out any of the methods hereby described.

The present disclosure also describes a specific mobile device comprising a processor, a memory and a networking module, the processor being configured to operate according to any of the methods hereby described.

Optionally, the specific mobile device is such that the networking module is a single radio networking module. In such cases, a potential risk of V2V communication failure may indeed be increased when moving from a source to a destination base station coverage, such risk being potentially lowered by use of the fallback link.

DESCRIPTION OF EMBODIMENT

This disclosure applies to operating a specific mobile device. A mobile device should be understood as a mobile communication device which is not stationary. Such mobile communication device may communicate using a networking module. Such a mobile device may be a mobile terminal carried by a human or by a vehicle. The mobile device may be a vehicle comprising a networking module. The mobile device may be carried by a driver or passenger of a vehicle. The mobile device may be configured to be mobile on a road network or in the air. The mobile device may be a drone comprising a networking module. The mobile device may be a car, truck or bus comprising a networking module. The mobile device may be a connected autonomous or partially autonomous vehicle configured to autonomously or partially autonomously drive itself by using radio resources. Autonomous driving may not require a human driver, while partially autonomous driving may require the presence of a human driver in a vehicle to operate.

Figure 1:
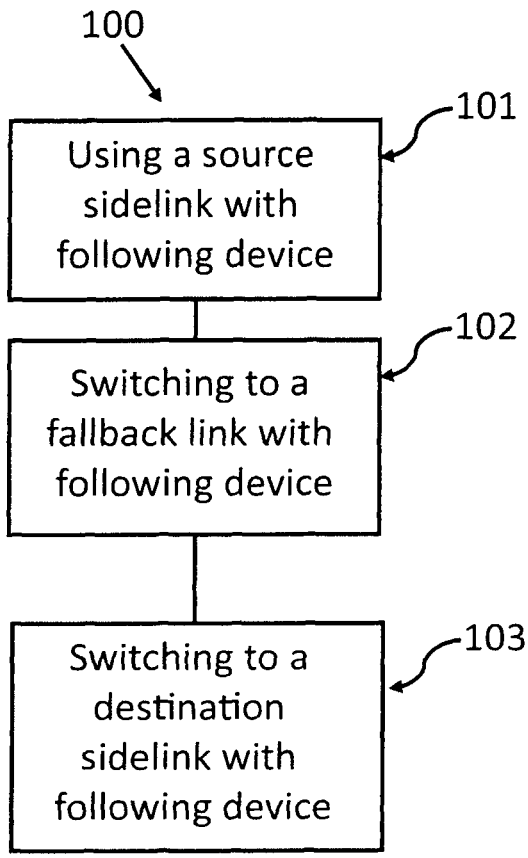
FIG. 1 illustrates an example method.

An example method 100, as illustrated in FIG. 1, applies to a specific mobile device moving from a source cell to a destination cell. Both the source cell and the destination cell are communication cells in a cellular radio network. The source cell may be a cell from which the specific mobile device departs, or may be a cell which the mobile device will pass through, coming from another cell. The destination cell may be a cell at which the specific mobile device will stop on arrival, or may be a cell which the mobile device will pass through, on its way to another cell. The wording "source" and "destination" is relative to the source cell and the destination cell, the mobile device moving from the source cell to the destination cell. In some examples, the source cell and destination cells may not be synchronized, i.e. they may not share a common time reference. The source cell and destination cell each have a coverage, the coverage of the source cell differing from the coverage of the destination cell. The coverage of the source cell and the coverage of the destination may overlap. The coverage of the source cell and the coverage of the destination may be disjoint. The specific mobile device is in movement from the source cell to the destination cell, such that the mobile device is moving from coverage of the source cell to coverage of the destination cell. When moving from the source cell to the destination cell, the specific mobile device may be in coverage of both the source cell and destination cell, or may be under coverage of neither the source cell nor the destination cell, or be under coverage of either the source cell or the destination cell. When moving from the source cell to the destination cell, the mobile device may pass through one or more intermediate cells, the coverage of such intermediate cells intersecting a trajectory of the mobile device between the source cell and destination cell.

The specific mobile device is according to this disclosure named as specific in order to differentiate such specific mobile devices from other mobile devices which may interact with this specific mobile device. The specific mobile device, may however be similar or different from other mobile devices.

The method 100 according to this example comprises using, in block 101, by the specific mobile device, a source sidelink to exchange signals with a following mobile device. The following mobile device is a mobile device according to this disclosure, the following mobile device being either similar or different from the specific mobile device, the following mobile device being distinct from the specific mobile device. The following mobile device is following whereby it has a general direction of movement in the same direction as a general direction of movement as the specific mobile device. The following mobile device and the specific mobile devices should be understood as generally moving in the same direction. The following mobile device and the specific mobile devices may move at a same speed or at different speeds. In some examples, a speed of the following mobile device differs from a speed of the specific mobile device by less than 20%. The following mobile device should be understood as reaching or passing through a given point or area after the specific mobile device reached or passed through such same point or area. In some examples, the following mobile device passes through a specific point less than 1 second after the specific mobile device. In some examples, the following mobile device passes through a specific point less than 5 second after the specific mobile device. In some examples, the following mobile device and the specific mobile device are separated by less than 200 meters. In some examples, the following mobile device and the specific mobile device are separated by less than 100 meters.

According to this disclosure, the specific mobile device and the following mobile device are connected to each other and may communicate with each other. Communication may be understood as exchanging data packets in the context of a communication protocol. Communication may be direct, i.e. directly between devices using respective networking modules, or indirect, i.e. through other intermediate networking devices such as, for example, a base station. Direct communications may use radio resources allocated dynamically by a base station ('mode 1'), or resources to be taken autonomously by a user equipment (UE) corresponding to a respective mobile device from a pool of resources which may be signaled by a base station or pre-configured in the UEs ('mode 2'). Mode 1 resource allocation allows a base station to better control the resources, thus limiting interferences and avoiding transmission collisions. According to this disclosure, communication between the specific device and the following device takes place through a source sidelink, source sidelink resources being managed by a source base station operating the source cell, the source sidelink using for example radio resources allocated dynamically by a base station (mode 1), whereby the specific and following mobile devices are located within the source cell. The source sidelink should be understood as permitting an exchange of signals directly between the specific device and the following device. Radio resources utilization may be operated for example through time/frequency allocation techniques, and/or through spatial re-use techniques. Radio resources utilization may be operated taken into account service Quality of Service requirements such as throughput, delay, packet error rate and priority. Using a sidelink for such communication between mobile devices may reduce communication latency and reduce cell load thanks for example to spatial re-use techniques. In some example, the source and destination base stations are stationary. In some example, the source and destination base stations are mobile. In some examples, the source and destination base stations are 5G gNBs or logical 5G radio nodes. In some other examples, the source and destination base stations are 4G eNBs. According to this disclosure, the specific and following mobile devices are using the source sidelink while being both located within the source cell. This has as a consequence that the specific and following mobile devices are both synchronized with the signals transmitted by the source base station.

It should be understood that due to the sidelink being associated to a given base station, such sidelink connecting different mobile devices will be synchronized to such given base station. As one of the mobile devices moves towards a different base station, a handover will take place which may submit the mobile device to different synchronizations being on one hand a synchronization with the given base station associated with the sidelink, and on the other hand a synchronization with the different base station. In a case of a mobile device unable to operate with different synchronizations, for example in the case of a mobile device comprising a single radio networking module, the mobile device should get disconnected from the sidelink in order to complete a handover to the different base station. Such disconnection from the sidelink will introduce latency in the communication between the different mobile devices. The present disclosure aims at resolving this issue. In some examples, the present disclosure aims at avoiding a specific mobile device switching directly from a source sidelink synchronized to a source base station to a destination sidelink synchronized to a destination base station which is not synchronized with the source base station.

Even if the source and destination base stations are synchronized, the radio resources are operated independently in the different base stations. When two mobile devices under the same cell coverage are connected through a sidelink managed by the serving base station and when one of the two mobile device is handed-over to a destination cell operated by another base station, the sidelink cannot be managed by two different base stations at the same time and has to be disconnected. The present disclosure aims at resolving this issue.

In order to resolve these issues, the example method 100 for operating a specific mobile device moving from a source cell to a destination cell comprises switching, in block 102, by the specific mobile device, from the source sidelink to a fallback link to exchange signals with the following mobile device, the fallback link resources being managed independently from any base station. Using such a fallback link independent from any base station thereby prevents a disconnection or latency between the mobile devices. Avoiding latency between mobile devices may for example reduce a risk of collision in the case of such mobile devices being vehicles on a road or street, drones, or mobile robots in a factory. Avoiding latency may also permit operating the mobile devices at a higher speed, or having them follow each other more closely, in time or distance. An example of a fallback link managed independently from any base station is an intelligent transport system, ITS, G5 peer-to-peer communication link or a Wifi radio link operating in ad-hoc mode. Another example of a fallback link managed independently from any base station is the use of a 3GPP PC5 interface operating in autonomous scheduling mode ('mode 2').

The use of a fallback link as per the present disclosure is not meant as a permanent communication link but as a transitional communication link. Indeed, as illustrated in block 103 of FIG. 1, example method 100 also comprises switching, by the specific mobile device, from the fallback link to a destination sidelink to exchange signals with the following mobile device, destination sidelink resources being managed by a destination base station operating the destination cell, whereby the specific device and the following device are located within the destination cell. The fact that such switching to a destination sidelink takes place when the specific device and the following device are located within the destination cell permits handling the movement from one cell to another using the fallback link while relying on the sidelinks when the mobile devices are both in a same cell. One should however note that in some examples, the mobile devices may pass through an intermediate cell between the source and destination cells while maintaining the fallback link in order to avoid unnecessary transitions. In some examples, the fallback link remains in place between the specific mobile device and the following mobile device for less than 10 seconds. In some examples, the fallback link remains in place between the specific mobile device and the following mobile device for less than 5 seconds.

One should note that the destination sidelink, destination cell and destination base station may have the same characteristics as the source sidelink, source cell or source base station. The destination sidelink, destination cell and destination base station may also have different characteristics from either one of the source sidelink, source cell or source base station.

Figure 2:
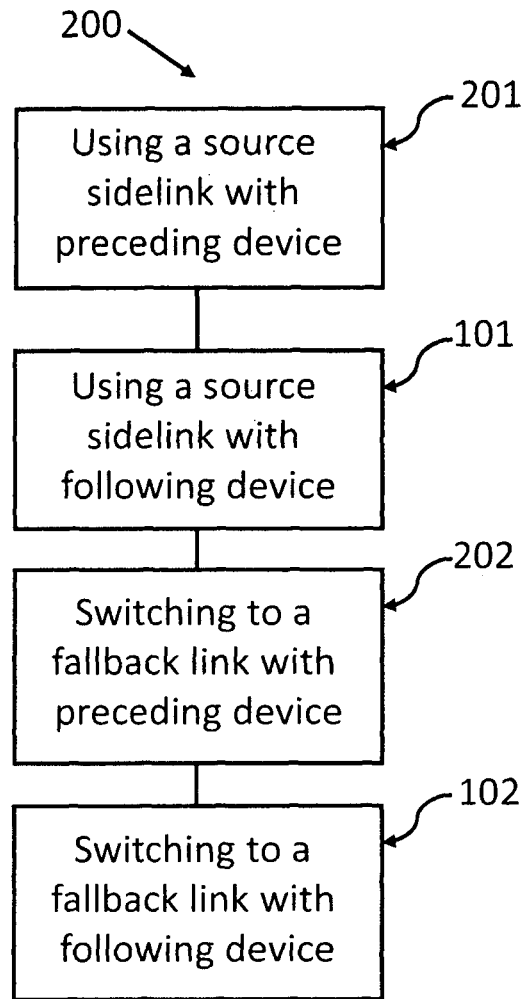
FIG. 2 illustrates another example method.

Another example method 200 is illustrated in FIG. 2. Such example method 200 comprises blocks 101 to 103 as per example method 100. Example method 200 further comprises, in block 201, using, by the specific mobile device, the source sidelink to exchange signals with a preceding mobile device, whereby the specific and preceding mobile devices are located within the source cell. During block 201, the following mobile device may also be located in the source cell, or may be located in another cell. In other words, block 201 and 101 may or may not overlap in time, depending on the location of the specific, preceding and following mobile devices.

The preceding mobile device is a mobile device according to this disclosure, the preceding mobile device being either similar or different from the specific mobile device, the preceding mobile device being distinct from the specific mobile device. The preceding mobile device is preceding whereby it has a general direction of movement in the same direction as a general direction of movement as the specific mobile device. The preceding mobile device and the specific mobile devices should be understood as generally moving in the same direction. The preceding mobile device and the specific mobile devices may move at a same speed or at different speeds. In some examples, a speed of the preceding mobile device differs from a speed of the specific mobile device by less than 20%. The preceding mobile device should be understood as reaching or passing through a given point or area before the specific mobile device reaches or passes through such same point or area. In some examples, the preceding mobile device passes through a specific point less than 1 second before the specific mobile device. In some examples, the preceding mobile device passes through a specific point less than 5 second before the specific mobile device. In some examples, the preceding mobile device and the specific mobile device are separated by less than 200 meters. In some examples, the preceding mobile device and the specific mobile device are separated by less than 100 meters.

Example method 200 also comprises, in block 202, switching, by the specific mobile device, from the source sidelink to the fallback link to exchange signals with the preceding mobile device while maintaining the source sidelink to exchange signals with the following mobile device. Block 202 may for example take place as the preceding device moves out of the source cell and into the destination cell. Block 202 permits avoiding break or latency in the communication between the preceding and specific vehicles as the preceding vehicle moves out to the source cell. A specific mobile device may, at some point in time, communicate both using the fallback link with one of the preceding or following mobile device, and with a sidelink with the other one of the preceding or following mobile device, and do so for example by having the specific mobile device indicate corresponding scheduling constraints to its serving base station, whereby the serving base station would be the source base station if the sidelink used is the source sidelink, or the destination base station if the sidelink used is the destination sidelink. The specific mobile device may indicate corresponding scheduling constraints to its serving base station in other situations also.

Example method 200 also comprises, in block 203, switching, by the specific mobile device, from the fallback link to the destination sidelink to exchange signals with the preceding mobile device while maintaining the fallback link to exchange signals with the following mobile device.

In some examples, the specific mobile device is one of a plurality of mobile devices forming a platoon, whereby a method according to this disclosure is applied successively to different mobile devices as such different mobile devices follow each other as the platoon moves from the source cell to the destination cell. The following mobile device according to this disclosure may thereby be considered as a "specific mobile device" in relationship with a further following mobile device. A platoon may be formed of a plurality of autonomous connected vehicles. A platoon may comprise more than 5 vehicles. A platoon may comprise more than 10 vehicles. Mobile devices forming a platoon may span more than two cells. Using the method according to this disclosure may permit increasing an overall speed of displacement of the platoon compared to using other communication solutions which would introduce additional latency due to using a different method to transition a mobile device from a source cell to a destination cell.

In some examples, the switching, by the specific mobile device, from the source sidelink to the fallback link to exchange signals with the following mobile device, comprises the specific mobile device sending a switching message to the following mobile device. The switching may indeed comprise exchanging several different messages between different elements participating in the process. The specific mobile device may be sending the switching message to the following mobile device using the source sidelink. Such switching message may comprise configuration information for the fallback link, for example indicating fallback link resources, or indicating a specific configuration selection number or code.

In some examples, the switching, by the specific mobile device, from the source sidelink to the fallback link to exchange signals with the following mobile device is triggered by the specific mobile device receiving a handover command originating from the source base station. Such handover command may be a handover command to switch from the source cell operated by the source base station to the destination cell operated by the destination base station.

In some examples, the switching, by the specific mobile device, from the source sidelink to the fallback link to exchange signals with the following mobile device is triggered by the specific mobile device measuring a signal or signal quality. The specific device may indeed for example detect a signal degradation with its serving station, in this case the source base station, using such signal degradation to trigger the switching from the source sidelink to the fallback link to exchange signals with the following mobile device, in order to avoid latency introduced for example by a switch from source sidelink to destination sidelink.

In some examples, the switching, by the specific mobile device, from the source sidelink to the fallback link to exchange signals with the following mobile device comprises the specific mobile device receiving a command originating from an application server. In some examples, the application server is provisioned with the status of the direct communication links of the specific mobile device, i.e. whether the direct communication link is a sidelink or a fallback link. In some examples, the application server communicates with the specific mobile device through the source base station. In some examples, the application server communicates with all mobile devices from a platoon according to this disclosure. In some examples, the application server is taking into account a geographical location of the specific mobile device in order to generate the signal. Indeed, in some examples, the switching, by the specific mobile device, from the source sidelink to the fallback link to exchange signals with the following mobile device, comprises the specific mobile device receiving a signal originating from an application server based on a geographical location of the specific mobile device. Basing the signal on geographical location permits proceeding with switching when the specific mobile device is in a transition zone between the source and the destination base stations.

In some examples, the switching, by the specific mobile device, from the source sidelink to the fallback link to exchange signals with the following mobile device, comprises the specific mobile device receiving a switching command originating from the source base station. The switching command originating from the source base station may comprise configuration information for the fallback link, for example indicating fallback link resources, or indicating a specific configuration selection number or code.

In some examples, the method comprises, prior to the switching by the specific mobile device from the source sidelink to the fallback link, sending, by the specific mobile device and to the source base station, a signal indicating fallback link scheduling constraints. Indicating such constraints to the base station may prevent disruption of the communication between the specific mobile device and the base station as the mobile device proceeds with switching to the fallback link.

In some examples, the switching, by the specific mobile device, from the source sidelink to the fallback link to exchange signals with the following mobile device, is preceded by a fallback link preparation step, the fallback link preparation step comprising sending a fallback link preparation message from the specific mobile device to the following mobile device, the fallback preparation message comprising fallback link configuration information. Proceeding with such preparation step may participate in reducing communication disruptions.

In some examples, the specific mobile device periodically proceeds with checking the availability of a fallback link resource. Proceeding with such periodical check may participate in reducing communication disruptions by permitting that the specific mobile device update fallback link resources as it travels. Such a periodical check may take place at least once per minute. Such a periodical check may take place at least once every 10 seconds.

Figure 3:
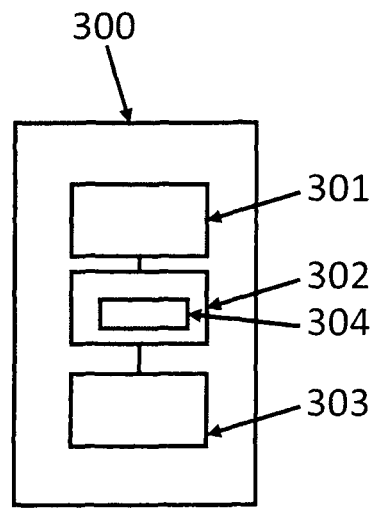
FIG. 3 illustrates an example mobile device.

FIG. 3 illustrates an example specific mobile device 300 comprising a processor 301, a memory 302 and a networking module 303, the processor 301 being configured to operate according to any of the methods hereby described. In some examples, the networking module is a single radio networking module. Processor 301 may comprise electronic circuits for computation managed by an operating system.

FIG. 3 also illustrates a non-transitory machine-readable or computer readable storage medium, such as, for example, memory or storage unit 302, whereby the non-transitory machine-readable storage medium is encoded with instructions 304 executable by a processor such as processor 301, the machine-readable storage medium comprising instructions 304 to operate processor 301 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

Further examples are hereby described, whereby the mobile devices are vehicles.

In these examples, the vehicles rely on a fallback link during a handover. This fallback link may use radio resources which are not scheduled by base stations, or may use radio access technologies other than cellular-based.

Figure 4:
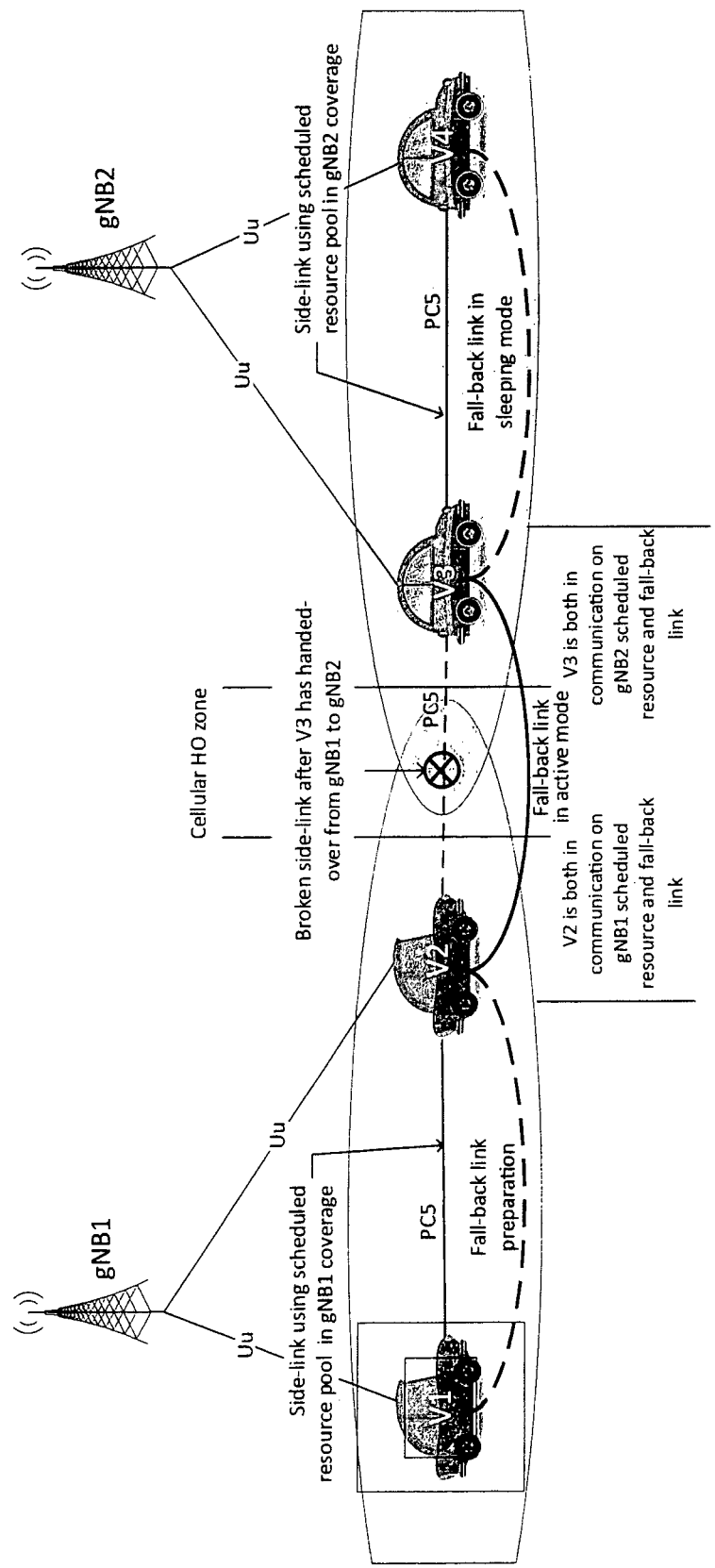
FIG. 4 illustrates a mobile devices configuration according to an example method.

In an example illustrated in FIG. 4, the fallback link may be using non-licensed bands (other bands may also be used in this example) and, in order to reduce resource usage, the fallback mode is only activated while the two vehicles being the specific V3 and following V2 mobile devices are connected via a sidelink belonging to two different cells operated by source base station gNB1 and by destination base station gNB2. In other words, in such an example, the fallback link is in place between the following and the specific vehicle only while the following vehicle is connected to the source sidelink (with one or more other following vehicles) and while the specific vehicle is, concurrently, connected to the destination sidelink (with one or more, different, other preceding vehicles). In this example, the sidelink communication between vehicles, or V2V (vehicle to vehicle) communications, are direct communications using a PC5 interface. In this example, the communication between a vehicle and a base station is over an Uu interface linking a UE (User Equipment corresponding to the mobile device or vehicle) to a base station (gNB1 or gNB2) being part of a Universal Mobile Telecommunications System, UMTS, Terrestrial Radio Access Network.

In this example, the time to switch from the cellular sidelink to the fall back link is reduced by using a preparation of the fallback link prior to proceeding with a handover of the specific mobile device from the source to the destination base station. Such switch may for example be triggered by mobility messages of a 5G system.

In this example, the time during which the fallback link is active is reduced whereby the switch back from the fallback link to the destination sidelink is accelerated by signaling.

In this example, the impact of handovers from the source base station to the destination base station on the platoon formed by mobile devices or vehicles V1, V2, V3 and V4 is limited in space to the vehicles located around a radio network cell border (V2 and V3 on FIG. 4) in handover zones. Impact is also limited in time whereby the switch back to using the destination sidelink, where V2V communications are supported by scheduled resource allocations such as the destination sidelink, happens shortly after the vehicles in V2V communications are back under the coverage of a cell operated by the same base station, in this case destination base station gNB2. A situation where the entire platoon would remain under fallback link is avoided in this example.

In this example, signaling may be limited to inter-vehicular signaling through sidelink. Signaling may also involve base stations, for example so as to improve time from recovery and multi-carrier support. Signaling may also involve the base stations and an application layer (Multi-access Edge Computing, MEC, approach) so as to take benefit from platoon knowledge at an MEC level.

Figure 5:
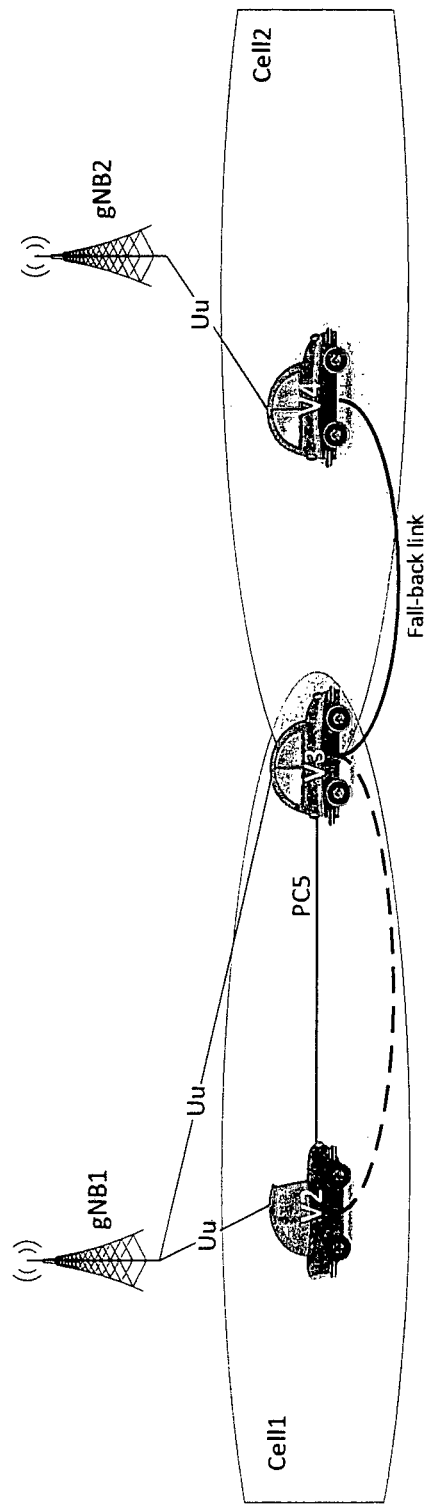
FIG. 5 illustrates another mobile devices configuration according to an example method.

In an example illustrated in FIG. 5, the source base station is gNB1, corresponding to Cell 1, the destination base station is gNB2 corresponding to Cell 2, the specific mobile device is vehicle V3, the following mobile device vehicle V2 and the preceding mobile device vehicle V4. V3 and V2 are represented as communicating via a source sidelink using a PC5 interface, V2 and V3 being under coverage of Cell 1, communicating with gNB1 via Uu. V3 is represented as communicating with V4 via a fallback link, V4 being under coverage of Cell 2, communicating with gNB2 via Uu. Both V2 and V3 y are radio-synchronized on gNB1. One should note that V3 may be connected via the source sidelink to other vehicles under coverage of cells operated by the source base station. One should note that V4 may be connected via the source sidelink to other vehicles under coverage of cells operated by the destination base station.

In this example, signaling takes place via exchanges directly between the vehicles to prepare the fallback link between V2 and V3 in order to switch from the source sidelink to the fallback link between V2 and V3, and to switch from the fallback link to the destination sidelink between V3 and V4. Such signaling may be triggered from cellular signaling, i.e. from one or both of the base stations, or by signal measurements made by the vehicles on radio signals.

In this example, V3 is connected to one vehicle or following mobile device, V2, through a source sidelink. In other examples, V3 may have a source sidelink in place with several neighboring vehicles or several following mobile devices.

Figure 6:
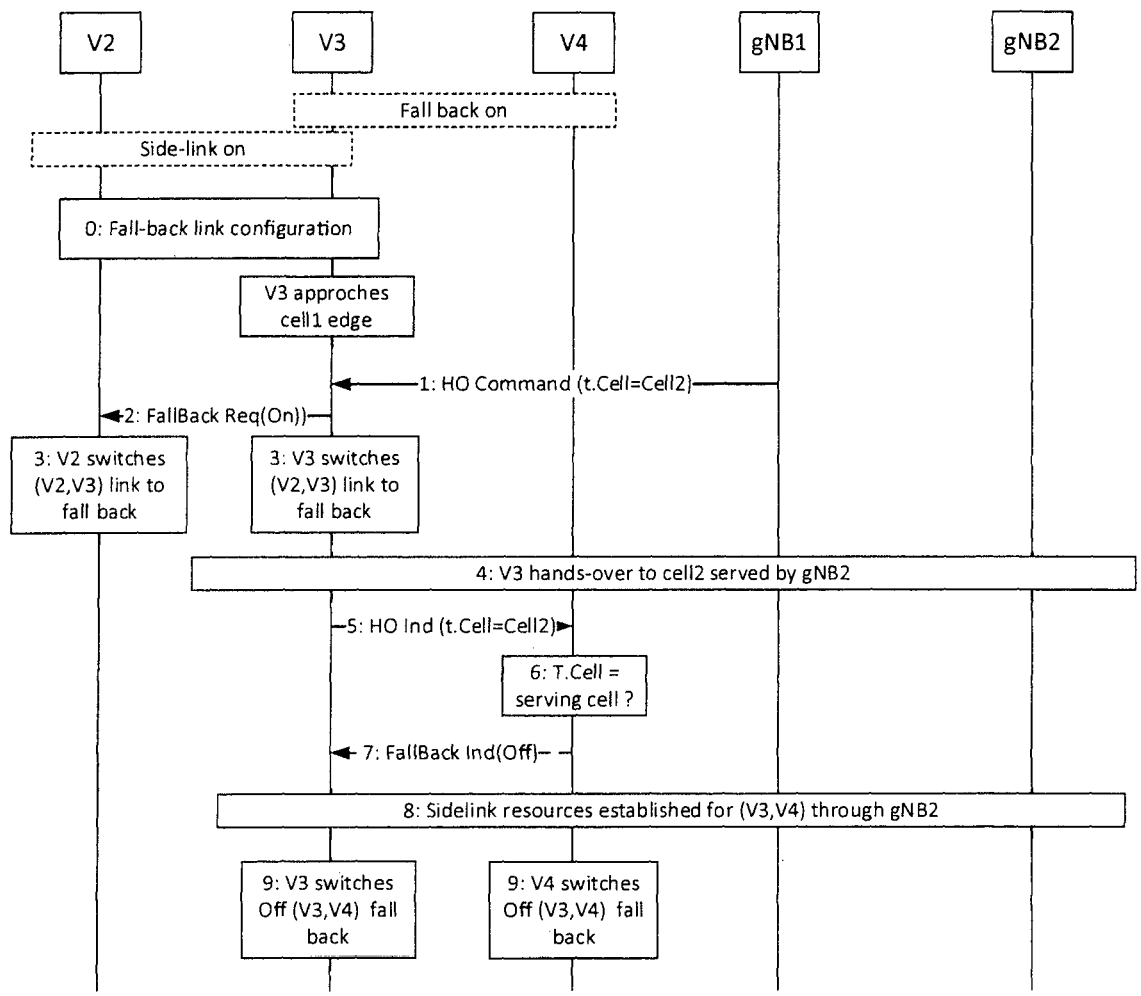
FIG. 6 illustrates an example of signaling flow according to an example method related to the configuration of FIG. 5.

FIG. 6 represents an example message flow corresponding for example to the example illustrated in FIG. 5. The successive steps of the example message flow are discussed below.

Step 0, labelled "fallback link configuration", corresponds to a preparation for fallback connection between V2 and V3 through a fallback preparation request. In this step, vehicle V3 sends a message to V2 so as to prepare a possible fallback link. The fallback preparation request message may include a Radio Access Technology, RAT, to use for the fallback link. Examples of RAT comprise Long Term Evolution, LTE, New Radio, NR, or wife. The message may also include a frequency to operate in, a radio resource pool (or a group of radio resource pools) to use in fallback link mode, or quality of service information such as bit rate or delay for example. The message may alternatively include an index to a fallback link configuration. The following vehicle V2 may acknowledge reception of the fallback preparation request.

This Fallback link preparation step 0 may in this example take place at any time V2 and V3 are under the coverage of the same source cell and as long as they have an operational source sidelink. The trigger for this fallback link preparation step 0 could for example be the establishment of the source sidelink between V3 and V2, measurements made by V3 on radio signals from gNB1 indicating a decreasing radio quality, or a combination of both.

V2 and/or V3 may periodically test the availability of a fallback link resource, for example V2 and/or V3 may periodically test the current load or remaining capacity of a given RAT or resource pool, and update the possible fallback link accordingly. V2 and V3 may also agree on a list of possible fallback links among themselves.

Alternatively, a fallback preparation step may take place in advance, for example whereby fallback link characteristics or resources may be pre-configured in the vehicles, for example using USIM cards (UMTS Subscriber Identity Module cards) of the vehicles.

Step 1, labelled "HO Command", takes place as V3 is approaching the cell edge of Cell 1. gNB1 prepares a hand-over of V3 to Cell 2 and sends a HO Command (Hand Over Command) to V3.

gNB1 may maintain a source sidelink grant for V3 during some time to allow V3 to execute step 2 without issues. A related validity time may be assigned with a fixed duration, depending for example of UE capability, or be dynamic and included in the HO command. If no more side link grant is available at this step for V3, V3 may use an exceptional sidelink resource pool.

Step 2, labelled "Fallback Req (On)" requests the switch from source sidelink to fallback link between V2 and V3. In order to reduce a possible V2V service interruption, the fallback link between V2 and V3 may be established before the source sidelink between V2 and V3 is broken. In this example, when V3 receives a HO command from its serving base station (source base station gNB1), and before V3 synchronizes to the target cell (operated by gNB2, the destination base station), V3 sends a fallback link Request to V2 through the still working source sidelink to warn its pair V2 that it is going to hand-over.

The Fallback link Request message may include an index to a pre-configured list of possible fallback links, an index to the list of possible fallback links agreed at step 0, or may refer implicitly to a fallback link configuration prepared at step 0 if, for example, the configuration is limited to one single fallback link option.

Step 3: V2 and V3 switch to fallback link.

Step 4: V3 proceeds with a hand-over (HO) procedure to Cell 2.

Step 5: Upon HO completion towards Cell 2, V3 sends a HO Indication message to all its pairs such as V4 (for example all members of a platoon of mobile devices to which V3 pertains) that it is communicating with through a fallback link. V3 may indicate in the message that it has joined Cell2.

Step 6: V4 checks whether V3 has joined its serving cell, i.e. the destination cell in this case. If it is the case, it means that a destination sidelink could be established between the specific mobile device V3 and the preceding mobile device V4. If a destination cell id provided by V3 is not identical to the ID of the cell which is serving V4, V4 can retrieve the base station id from the cell ids and checks whether the cells are operated by the same base station. If it is the case, a destination sidelink could be established between the specific mobile device V3 and the preceding mobile device V4. V4 may also sends a message to its serving base station including the cell id provided by V3 to request whether the cell serving V3 is able to support a destination sidelink with V4.

Step 7: V4 indicates to V3 through the fallback link that the fallback link could be put off with a Fallback link Indication (Off) message.

In some examples, this indication that the fallback link could be put off is conditioned by the quality of the Uu link between V4 and the current serving gNB2, for example by comparing such quality of the Uu link with a threshold. In case of insufficient link quality (for example if V4 is about to prepare itself a handover to yet another cell because V4 is already moving out of coverage of the destination cell), no indication is sent and communication continues in fallback mode until steps 6 and 7 may be validated again, possibly under a new destination cell.

Step 8: V3 requests gNB2 resources for a destination sidelink (with V4). V4 requests gNB2 resources for the destination sidelink (with V3).

Step 9: V3 and V4 put off the fallback link.

In some examples, on a periodic basis, V3 checks with its pairs it has a fallback link with whether they are or not under the same cell coverage. This may be done through a InfoRequest(ServingCell)/InfoRequestResp(ServingCell) exchange. This may be useful to switch back from a fallback link to sidelink even if a hand over event has been missed.

In another example, Step 7 is not present, and it is up to V4 to request to gNB2 destination sidelink establishment with V3 (Step 8).

In another example, V2, V3 and V4 send a message to an application server when they have switched from the sidelink to a fallback link (step 3) and when they have switched from the fallback link to a sidelink (step 9). Hence, the application server is aware about the connectivity status of the platoon members.

Signaling messages (steps 2, 5, 7) may be V2V application-level messages; step 2 message may be transported over source sidelink, steps 5 and 7 messages may be transported over fallback link.

Figure 7:
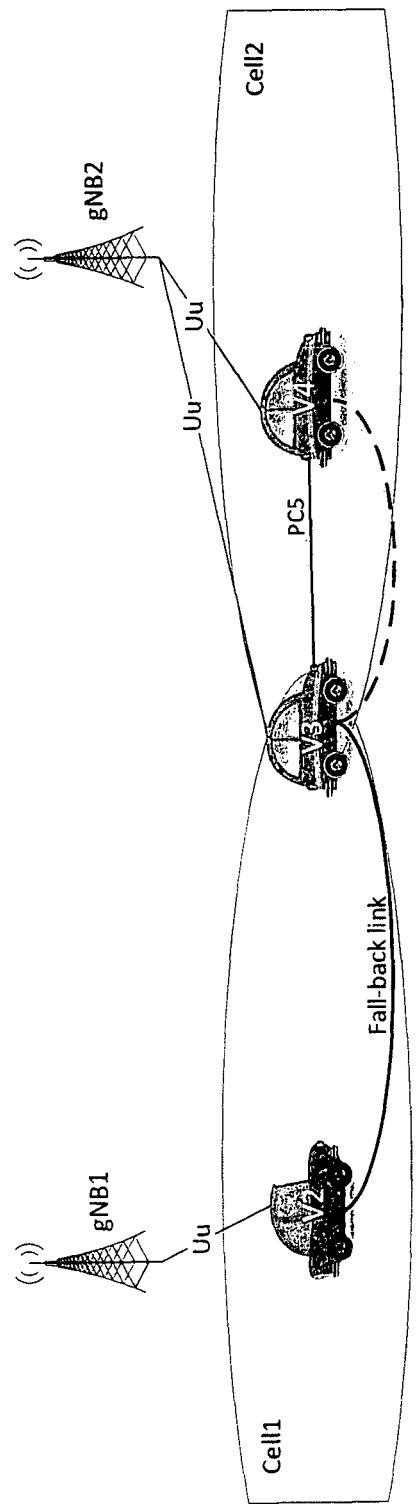
FIG. 7 illustrates a mobile devices configuration corresponding to the configuration of FIG. 5 following the execution of flow signaling as illustrated in FIG. 6.

After proceeding with the example message flow illustrated in FIG. 6, the example configuration illustrated in FIG. 5 may correspond to the example configuration illustrated in FIG. 7, whereby the specific mobile device V3 communicates with the following mobile device V2 through fallback link, and with preceding mobile device V4 through destination sidelink using PC5.

Figure 8:
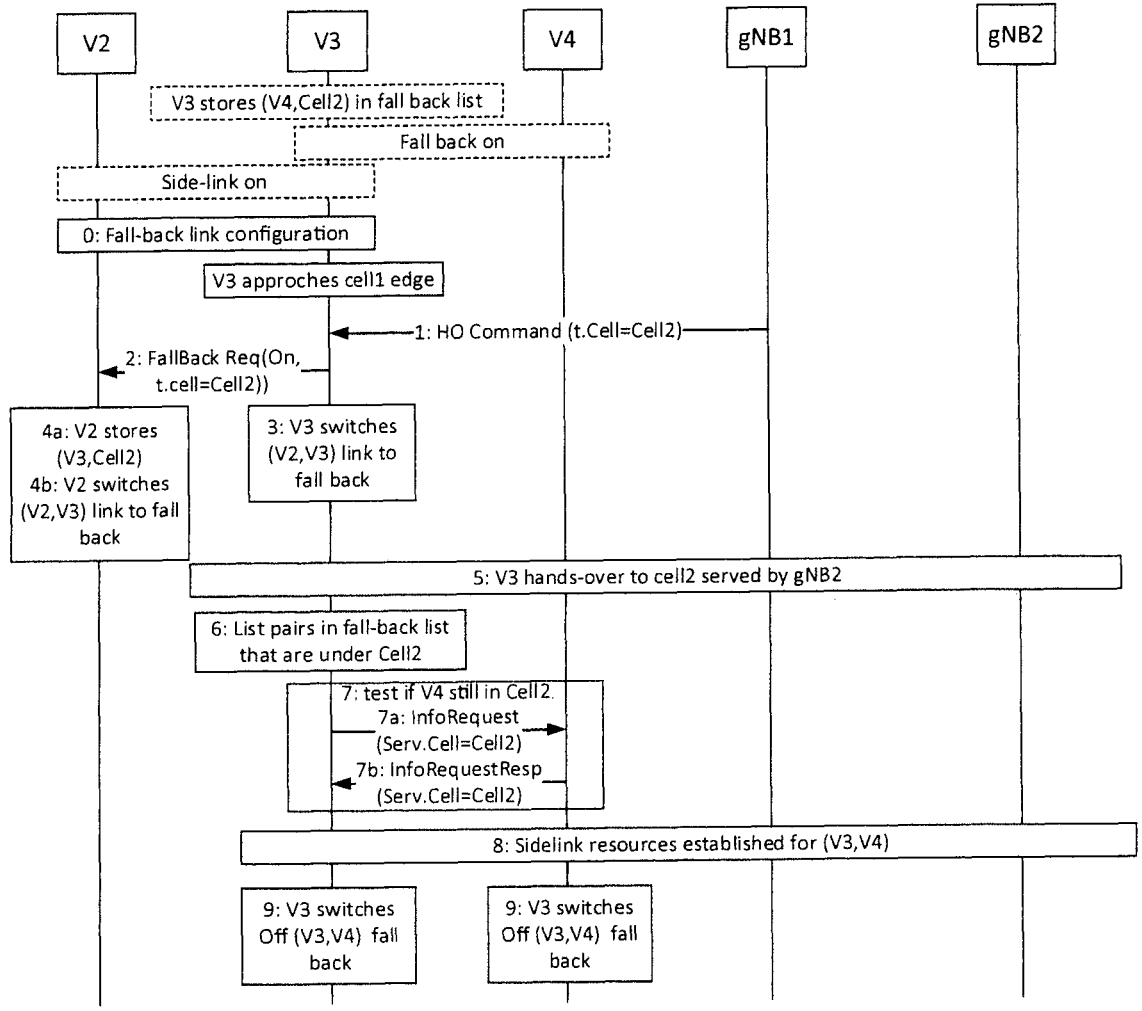
FIG. 8 illustrates another example of signaling flow according to an example method related to the configuration of FIG. 5.

Another example of message flow is illustrated in FIG. 8, whereby the vehicle V3 being handed over sends in the Fallback link Request the cell identity of the cell it is going to be handed-over, i.e. the cell identity of the destination cell. The receiving node V2 stores the cell identity of the pair (in this case, V3) it has a fallback link with (C.f. steps 2 and 4a of FIG. 8).

With this indication stored, when a vehicle is handed over to a new cell, it can list the pairs (i.e. the different mobile devices) it has a fallback link with but that are now under the same destination cell coverage (step 6 of FIG. 8), and request a destination sidelink establishment (step 8 of FIG. 8) and put the fallback link off (step 9 of FIG. 8).

In order to increase safety, a check may be introduced as to whether the pair is still under the cell that has been stored. This may be done in step 7 of FIG. 8 through InfoRequest(ServingCell)/InfoRequestResp(ServingCell) exchange.

Figure 9:
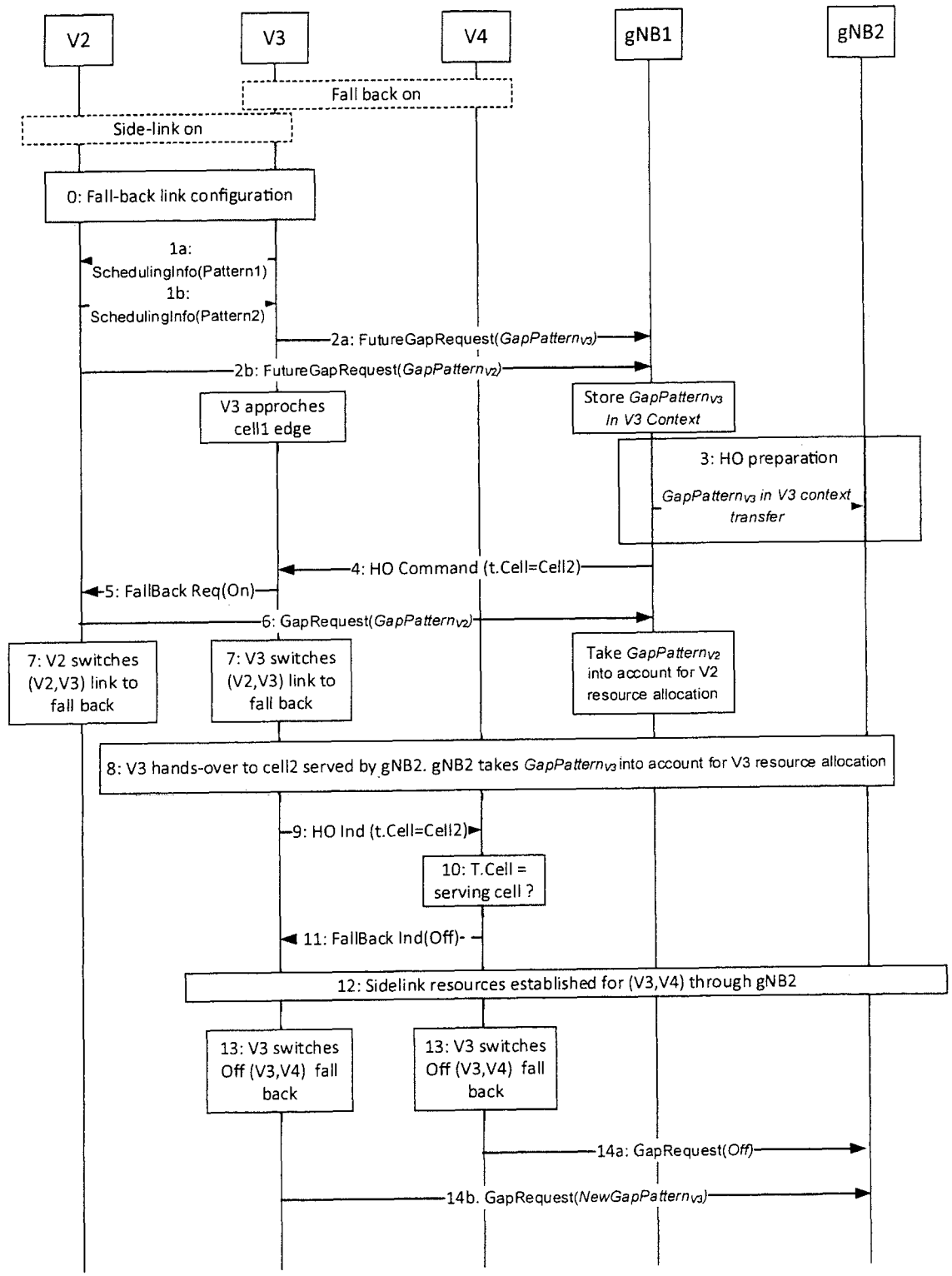
FIG. 9 illustrates another example of signaling flow according to an example method related to the configuration of FIG. 5.

FIG. 9 illustrates an example with Service continuity with mode 1/mode 2 time multiplexing.

In the example of FIG. 9. The fallback link may be based on PC5 autonomous scheduling ("mode 2") over a resource pool common between at least gNB1 and gNB2 (a pre-configured resource pool for example). This resource pool may be located in the same carrier frequency as a carrier frequency of Cell 1 (gNB1), as a carrier frequency of Cell 2 (gNB2) or in yet another frequency.

A vehicle in-coverage having a V2V link over a fallback link (say for example V3 in the situation described in FIG. 7, served by destination cell operated by gNB2) hence should operate (i.e. transmit and/or receive) over Uu with its serving base station, in this case destination base station gNB2, over a scheduled destination sidelink for V2V service with one paired vehicle (say preceding mobile device V4, also served by gNB2 as per FIG. 7), and over the fallback link with another paired vehicle (say following mobile device V2, served by source base station gNB1). The first two links, i.e. the Uu between V3 and gNB2 and the destination sidelink between V3 and V4, are under serving base station gNB2 control for resource allocation in frequency and time, while the allocation is made autonomously by the UEs for the third link (i.e. the fallback link between V3 and V2), and while the Uu between V2 and its serving cell Cell1 is under gNB1 control.

If V3 and/or V2 comprise a networking module having one radio chain only, or single radio, V2 and V3 should have sufficient time to switch their radio chain between scheduled operation and autonomous operation. Hence, some coordination may take place between scheduled allocations at a V2 side, scheduled allocations at a V3 side, and autonomous allocations between V2 and V3, for example scheduled allocations in time (i.e. time sharing between mode 1 and mode 2).

As per the example illustrated in FIG. 9, during fallback link preparation, V2 and V3 agree on an autonomous scheduling pattern to be used when the fallback link will be active. Messages SchedulingInfo(Pattern) between the 2 vehicles describing autonomous scheduling planning may be at a PC5 RRC (Radio Resource Control) level, and include for example SPS (Semi Persistent Scheduling) interval, timing offset or traffic patterns. In this example, V2 provides to V3 a scheduling pattern corresponding to transmissions from V2 to V3, and V3 provides a scheduling pattern corresponding to transmissions from V3 to V2. The complete scheduling pattern could then for example be the union of the pattern for the two direction (Steps 1a and 1b of FIG. 9).

Then V2 and V3 warn, in the example of FIG. 9, the serving base station (here source base station gNB1) about the scheduling pattern they envisage in a FutureGapRequest message (steps 2). This message indicates for example the timing constraints for V2 (GapPattern$_{V2}$) and V3 (GapPattern$_{V3}$) coming from their intended traffic on the autonomous pool used by the fallback link. The base station gNB1 stores this information for future use in V2 and V3 contexts respectively. Since V3 has two V2V connections, GapPattern$_{V3}$ takes into account constraints for the potential 2 fallback links, i.e. between mobile devices pair (V3, V2) and mobile devices pair (V3, V4).

In the example of FIG. 9, When gNB1 prepares with gNB2 to handover V3 to target Cell2 (step 3), gNB1 includes the GapPattern that has been stored for future use in the hand-over preparation procedure with gNB2 as part of UE context transfer, the UE being in this case mobile device V3. When V3 will attach to Cell2, gNB2 may thereby take the time constraints of V3 into account with deduced delay.

In the example of FIG. 9, before V2 switches on the fallback link (step 7), V2 requests gaps to its serving base station gNB1 in a GapRequest message (step 6). Gaps indicated corresponds to constraints due to fallback link between mobile devices pair (V3, V2). gNB1 then may take V2 time constraints into account.

In the example of FIG. 9, when V3 eventually hands-over to Cell2 (step 8), the time constraints for (V2, V3) fallback link to operate may be respected on the V2 side by gNB1 and on the V3 side by gNB2.

In the example of FIG. 9, when the fallback link between V3 and V4 may be switched off (step 13), V4 and V3 update the gap request accordingly (step 14). For V4, no more gaps may be considered at this time due to not being connected to a fallback link. In this example, for V3, NewGapPattern$_{V3}$ takes into account (V3, V2) fallback link only.

In the example of FIG. 9, it should be noted that the gap patterns indicated by FutureGapRequest messages may be kept in UE contexts in the base stations for future use as long as they are not updated by further messages. A possible handling of GapPatterns in base stations could be as follows:

|  | Current GapPattern | GapPattern for future use |
| --- | --- | --- |
| UE context i | The one in use. Comes from GapRequest messages | To be transferred during HO preparation from source to destination base station. Comes from FutureGapRequest messages |

Figure 10:
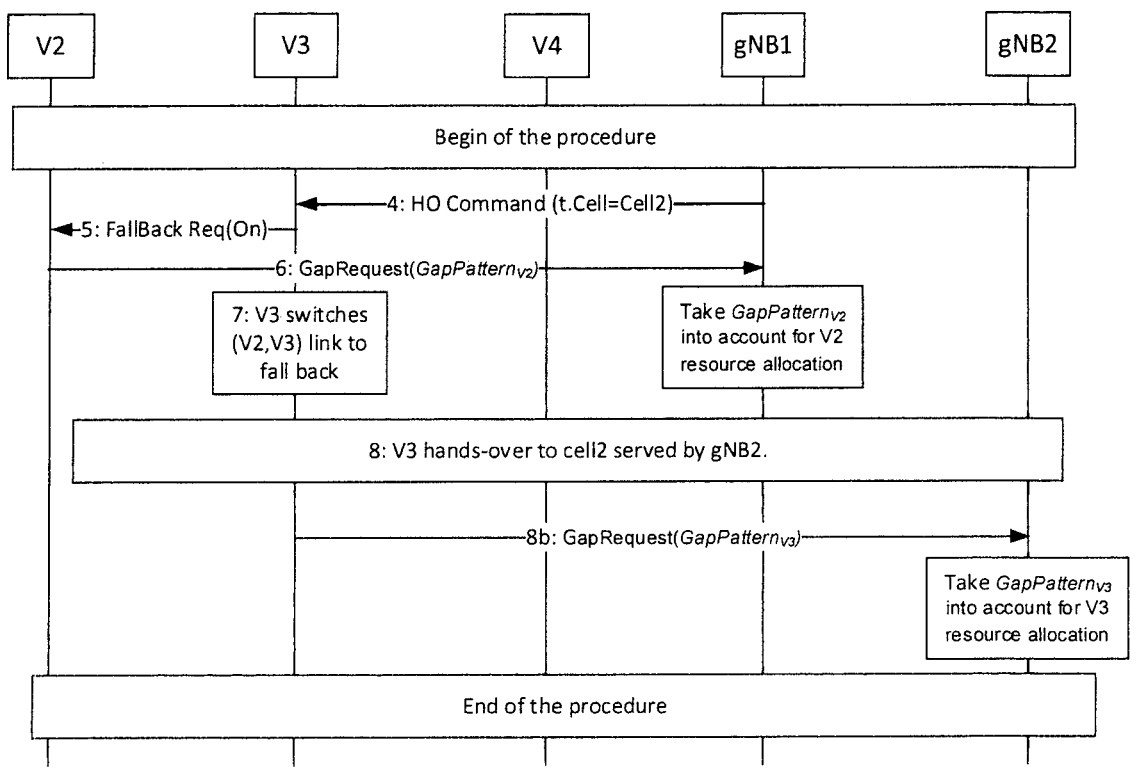
FIG. 10 illustrates another example of signaling flow according to an example method related to the signaling flow of FIG. 9.

FIG. 10 illustrates an alternative without inter-base station coordination compared to the example of FIG. 9, FIG. 10 focusing on a specific section between steps 4 and 8 (both included) differing from the example illustrated in FIG. 9. The remaining steps may remain as per FIG. 9.

In the example of FIG. 10, vehicle pairs agree on an autonomous scheduling pattern per pair to be used when the fallback link will be active, as per the example of FIG. 9. The vehicle pairs do not however transfer the patterns to their base station as 'for future use' (steps 2a and 2b 9 are skipped). V2 sends to gNB1 a GapRequest(GapPattern$_{V2}$) just before activating the fallback link (step 6) as per the example of FIG. 9. V3 sends to gNB2 a GapRequest (GapPattern$_{V3}$) just after it has completed the hand-over (step 8a) The pattern provided takes into account constraints for the 2 fallback links, i.e. the fallback link between pair (V3, V2) and the fallback link between pair (V3, V4). Gap requests are updated after fallback link with V2 has been switched off (step 14 of FIG. 9).

This solution illustrated in FIG. 10 allows maintaining a fallback link between V2 and V3 while the vehicles are served by the same cell. In some cases, there could be a small service interruption on pair (V2, V3) fallback link during the time the UE, V3, has attached to the destination cell gNB2 until it has requested some gaps.

Figure 11:
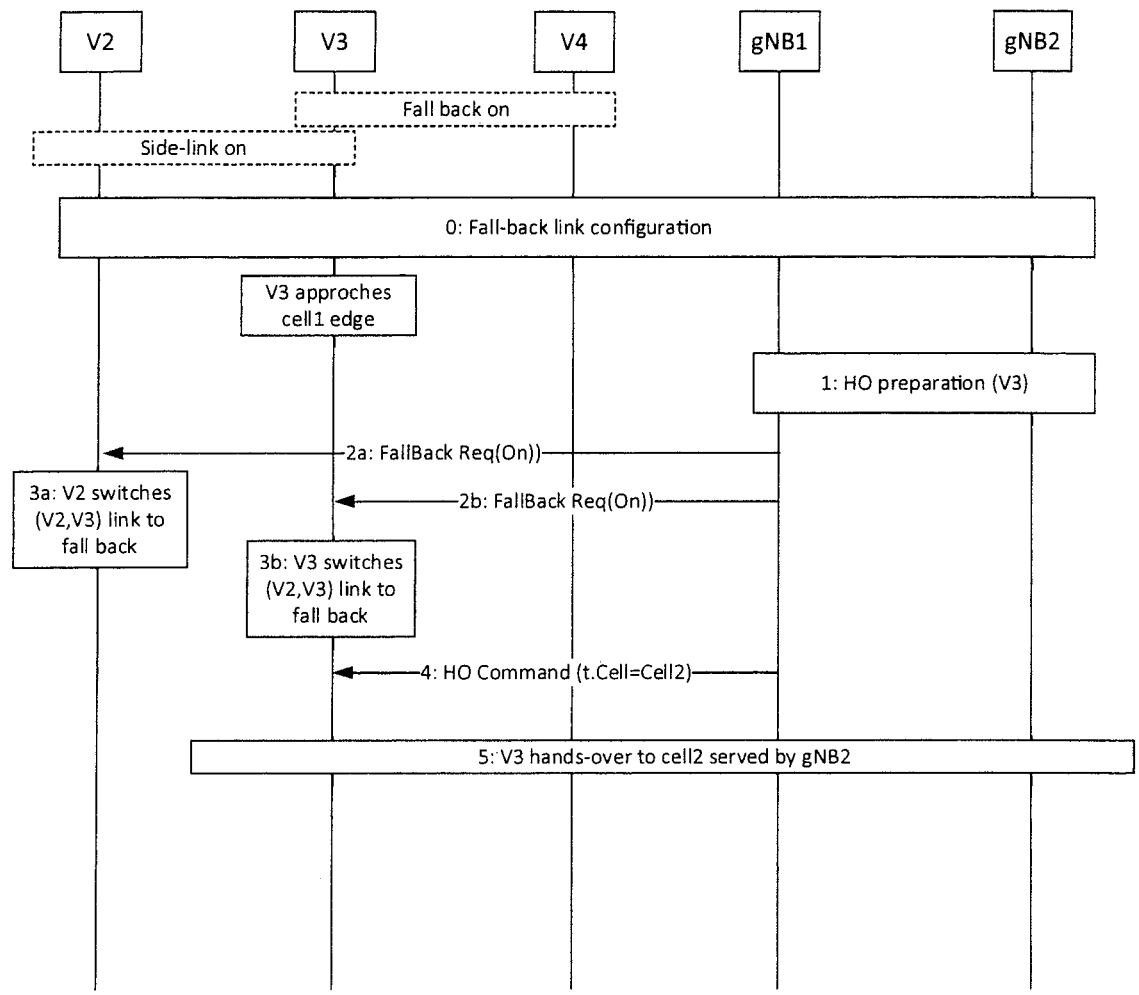
FIG. 11 illustrates another example of signaling flow according to an example method related to the configuration of FIG. 5.

FIG. 11 illustrates an example of Service continuity with signaling implying base stations. Such an example message flow may be used for example when the cellular network supports unicast side-link communications, whereby a base station may have a knowledge of V2V communication end points, i.e. the base station is aware of each side of a scheduled unicast side-link when both sides are served by the same base station. Having a common UE identification across base stations may however potentially cause confidentiality issues. In such cases, UE identifications may not be common across base stations, i.e. a base station may not be able to identify a UE or mobile device served by another base station. The base stations may however contribute to V2V service continuity using the procedure as per FIG. 11.

In FIG. 11, Step 0, the serving base station, source base station gNB1, is made aware of the fallback link configuration. V2 and V3 may agree through direct communication on a fallback configuration and warn the serving base station gNB1 about the fallback agreement. Alternatively, V2 and V3 may warn the serving base station gNB1 of their preference for fallback link configuration, and the serving base station may configure V2 and V3 with a matching configuration or a list of matching possibilities. V2 and V3 preferences could be included in UE capability information.

Step 1 of FIG. 11: Base station gNB1 negotiates with gNB2 the handover of V2 to Cell2.

Step 2 of FIG. 11: gNB1 sends a Fallback link Request to V2 and V3.

Step 3 of FIGS. 11: V2 (3a) and V3 (3b) switch to fallback link.

Step 4 of FIG. 11: gNB1 sends the HO Command to V3.

Step 5 of FIG. 11: V3 executes the normal hand-over procedure to Cell2.

The switch back to normal destination sidelink mode in FIG. 11 is similar to step 5 of FIG. 6.

Step 3b of FIG. 11 may take place after step 4.

Figure 12:
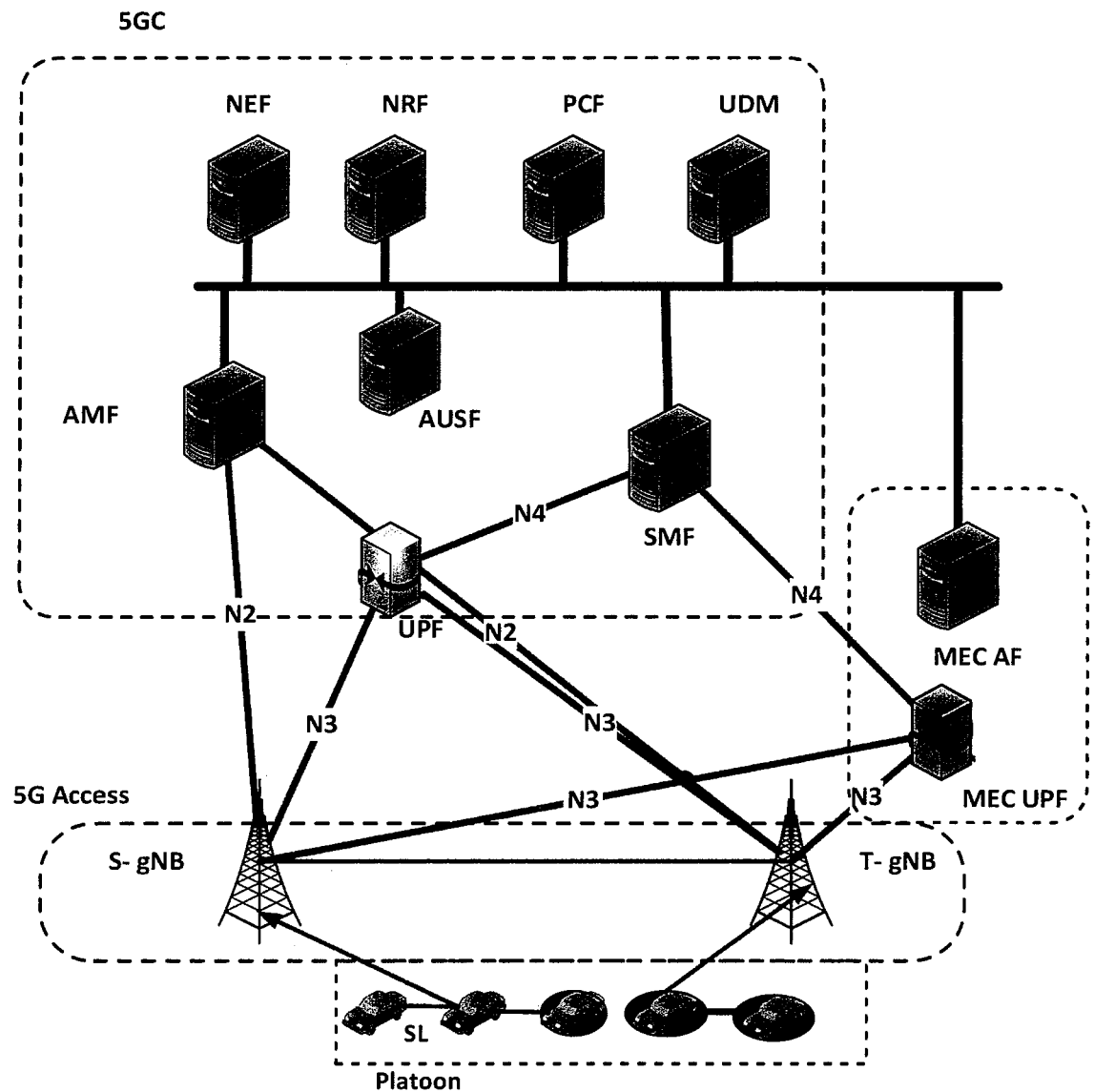
FIG. 12 illustrates another mobile devices configuration according to an example method.

FIG. 12 illustrates signaling through a MEC approach in a 5G network architecture (global view with MEC). In this example, a V2X (Vehicle to Everything) application server, which manages the V2X service and in particular a platoon of mobile devices as per this disclosure, controls also, in conjunction with the base stations, the swaps between scheduled sidelink and fallback link communications for the V2X services, between platoon members according to this disclosure. This approach may benefit from a MEC implementation since, even if platoons may be long and are moving, they tend to remain in a limited geographical area during a certain time. Such example MEC approach may then bring benefits of fast reactivity and limited impacts on network signaling load due to its distributed nature.

FIG. 12 illustrates a platoon comprising 5 vehicles, three vehicles (including V2 and V3 as per other examples) on the left hand side under source cell coverage from source base station S-gNB being connected to each other by source sidelink SL, 2 vehicles on the right hand side (including V4 as per other examples) being under destination cell coverage from destination (or Target) base station T-gNB and being connected to each other by a destination sidelink, the two vehicles bridging the source and destination cell (corresponding to V3 and V4) having no sidelink connection between them. FIG. 12 comprises connected elements of the 5G Core system (5GC) such as the NEF (Network Exposure Function), NRF (Network Repository Function), PCF (Policy Control function), UDM (Unified Data Management), AMF (Core Access and Mobility Management Function), AUSF (Authentication Server Function), SMF (Session Management Function) and UPF (User plane Function).

FIG. 12 also illustrates the MEC AF (Application Function) and MEC UPF (User Plane Function). The point to point interactions N2, N3 or N4 between the various elements are also represented.

In the example of FIG. 12, it is assumed that the V2X application server is aware of the platoon topology, i.e. it can identify each members of the platoon of mobile devices and the logical links between its members.

In the example of FIG. 12, it is assumed that the cellular network can expose to the V2X application server some radio-related properties and status of the different platoon members. This network feature could typically be offered in the 3GPP 5G core network by the NEF.

In the example of FIG. 12, due to its topology knowledge, the V2X application server can for example keep a fallback link active while crossing a given cell if it detects that the platoon stay in the cell will be short, due for example to geographical characteristics, such as cell shape or platoon speed.

In the example of FIG. 12, the V2X application server can know from configuration, or learn from previous cases, that some regions may have some cellular system coverage issues. Being aware of the platoon topology and vehicle localization, the V2X application server can request the switch to fallback link of some links in advance, i.e. before quality of service from the cellular coverage falls too low for a correct V2V service. Example messaging steps are described below corresponding to a structure as per FIG. 12, using the reference numeral of FIGS. 5 and 7:

Step 0: Fall back preparation. The V2X application can prepare a fallback link at any time the platoon is under radio coverage. As it is aware of the platoon member's geographical position, the fallback link can be different depending on the region. In 3GPP specifications, it is possible for a base station to select a resource pool for side link communications depending of the location a UE may report, but here the example feature is extended to different RAT. In addition, the fallback link preparation can be different in a given location for different vehicle pairs or for different periods of time, depending on road traffic load for example.

Step 1: As V3 is approaching the cell edge of Cell1, gNB1 requests V3 to make measurements to neighboring cells. Those measurements are exposed to V2X application server.

Step 2: Depending on radio signal quality, V2X application server decides to request V3 and V2 to switch to a fallback link. It sends Fallback link Request (On, V3, V2) message to V2 and V3. The message includes an identification of the V2V link under consideration and the action to perform Alternatively, Step 2 V2X application server decides to request to V3 and V2 to switch to fallback link. V2X application server sends Fallback link Request (On, V3, V2) message to V2 and V3 based on the current location of V2 and V3 as obtained from a MEC location API. In this case, the Step 1 may be skipped.

Step 3: V2 and V3 switch to fallback link

Step 4: gNB1 prepares a hand-over to Cell2 and sends a HO Command to V3. V3 performs a normal hand-over procedure to Cell2

Step 5: Upon HO completion, target base station gNB2 exposes to V2X application server that V3 has handed over to Cell2. This information may be obtained from MEC radio network information API.

Figure 13:
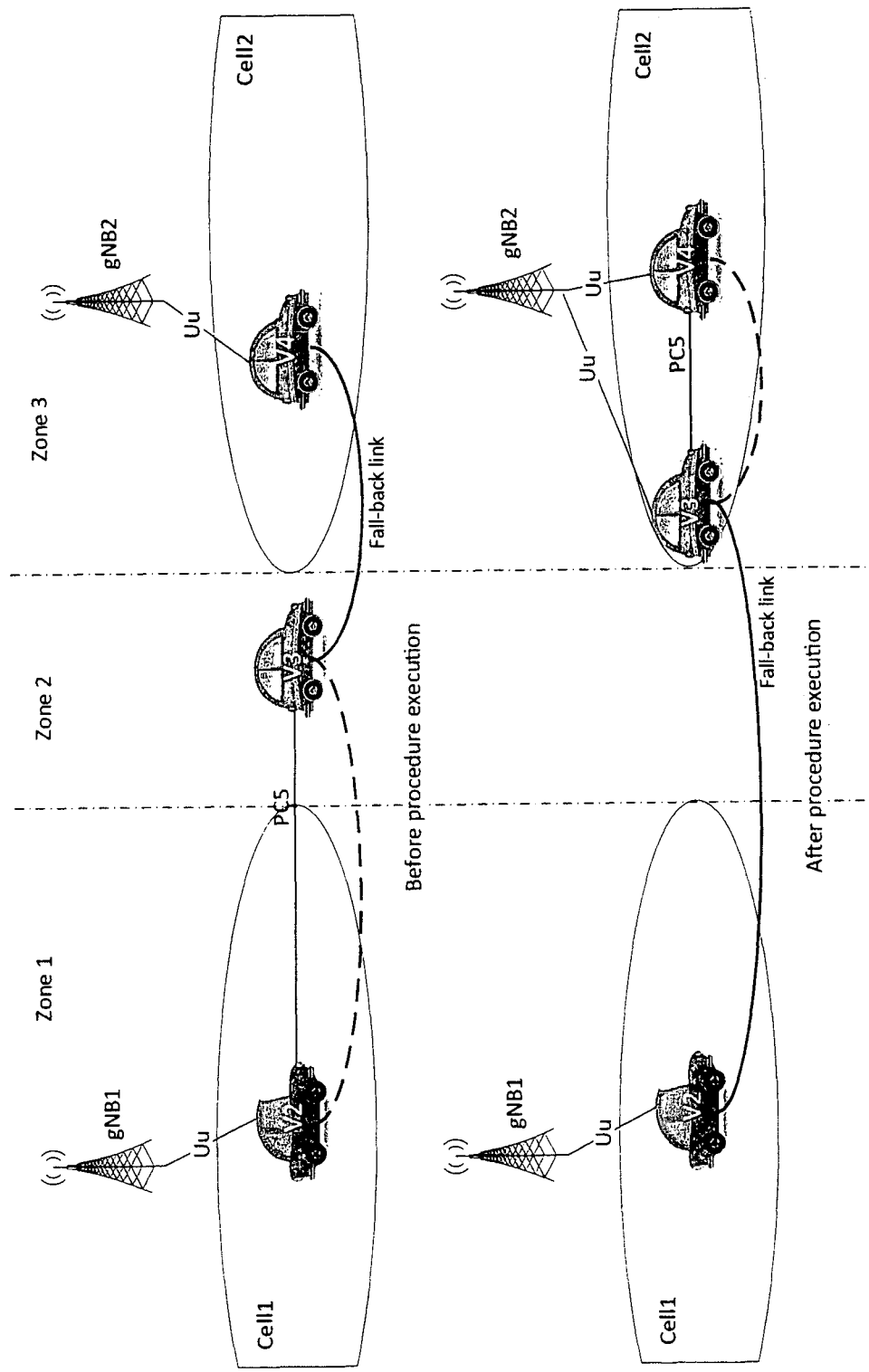
FIG. 13 illustrates another mobile devices configuration according to an example method.

Step 6: From its topology knowledge of the platoon, the V2X application server detects that V3 has a fallback link to V4 and that V3 and V4 are now under the same destination cell coverage. V2X application server sends a Fallback link Request (Off, V3, V4) message to V3 and V4. The message includes an identification of the V2V link under consideration and the action to perform Step 7: V3 requests gNB2 resources for a destination sidelink. V4 requests gNB2 resources for a destination sidelink Step 8: V3 and V4 put off the fallback link FIG. 13 illustrates an example application to out-of-coverage/in-coverage transitions. When a vehicle of a platoon enters a zone without cellular network coverage, it may be foreseen that its side links may be maintained, in order to keep a time synchronization to a former serving cell through a following vehicle that is still under network coverage. However, when a cellular deployment is such that there is a coverage hole between two cells, it may happen that the platoon extends to 3 different zones: zone 1 under Cell1 coverage, zone 2 with no coverage, and zone 3 under coverage of Cell2. In such a situation, the source sidelink may be maintained up to the vehicle which is entering zone 3, but would be broken due to the synchronization issue already mentioned due to the base stations not being time-synchronized.

FIG. 13 illustrates an example application to solve this issue, applying the fallback link procedure according to this disclosure, the top section of FIG. 13 illustrating the situation prior to proceeding with executing an example method according to this disclosure, the bottom section of FIG. 13 illustrating the situation after proceeding with executing an example method according to this disclosure.

We assume in the example of FIG. 13 that vehicle V3 is about to enter zone 3. It has a source sidelink with following vehicle V2 and a fallback link to preceding vehicle V4, V4 being already attached to Cell2.

An example messaging flow applying to the situation illustrated in FIG. 13 may be as follows:

Step 1: V3 monitors radio signals and detects Cell2 as a good candidate for re-establishment of a communication link with a destination base station gNB2.

Step 2: V3 sends a Fallback link Request (On) to the pairs it has a side link with, in this case, following mobile device V2.

Step 3: V2 and V3 switch to fallback link

Step 4: V3 attaches to Cell2 as destination cell.

Step 5: V3 sends a HO Indication message to all its peers (such as V4) that it is communicating with through a fallback link. V3 indicates in the message that it has joined Cell2.

Step 6: V4 checks whether V3 has joined its serving cell, destination Cell Cell2. If it is the case, it means that a destination sidelink could be established between V3 and V4.

Step 7: V4 indicates to V3 through the fallback link that the fallback link could be put off with Fallback link Request (Off) message.

Step 8: V3 requests destination base station gNB2 resources for a destination sidelink (with V4). V4 requests destination gNB2 resources for a destination sidelink (with V3).

Step 9: V3 and V4 put off the fallback link

If V3 is eventually rejected from Cell 2 at step 4, V3 may send a Fallback link Request (Off) to the peers it has previously sent a Fallback link Request (On) with at step 2, to switch back to the initial operation mode.

In some examples, triggers are used to send the switch messages. In some examples, a Fallback link Request (On) is sent when the UE, or specific mobile device, detects a good candidate destination cell for establishment of a destination sidelink, instead of triggering a message transmission from HO command received from the base station, and send an HO Indication message sent upon attachment to the new cell instead of after hand-over completion.

The invention claimed is:

1. A method for operating a specific mobile device moving from a source cell to a destination cell, the method comprising:
   using, by the specific mobile device, a source sidelink to exchange signals with a following mobile device, source sidelink resources being managed by a source base station operating the source cell, whereby the specific and following mobile devices are located within the source cell and the following is in a movement direction;
   switching, by the specific mobile device, from the source sidelink to a fallback link to exchange signals with the following mobile device, the fallback link resources being managed autonomously, whereby the switching, by the specific mobile device, from the source sidelink to the fallback link to exchange signals with the following mobile device, comprises the specific mobile device sending a switching message to the following mobile device;
   switching, by the specific mobile device, from the fallback link to a destination sidelink to exchange signals with the following mobile device, destination sidelink resources being managed by a destination base station operating the destination cell, whereby the specific device and the following device are located within the destination cell.

2. The method according to claim 1, whereby the method further comprises:
   using, by the specific mobile device, the source sidelink to exchange signals with a preceding mobile device, whereby the specific and preceding mobile devices are located within the source cell;
   switching, by the specific mobile device, from the source sidelink to the fallback link to exchange signals with the preceding mobile device while maintaining the source sidelink to exchange signals with the following mobile device;
   switching, by the specific mobile device, from the fallback link to the destination sidelink to exchange signals with the preceding mobile device while maintaining the fallback link to exchange signals with the following mobile device.

3. The method according to claim 1, whereby the specific mobile device is one of a plurality of mobile devices forming a platoon, whereby the method is applied successively to different mobile devices as such different mobile devices follow each other as the platoon moves from the source cell to the destination cell.

4. The method according to claim 1, whereby the switching, by the specific mobile device, from the source sidelink to the fallback link to exchange signals with the following mobile device is triggered by the specific mobile device receiving a handover command originating from the source base station.

5. The method according to claim 1, whereby the switching, by the specific mobile device, from the source sidelink to the fallback link to exchange signals with the following mobile device is triggered by the specific mobile device measuring a signal or signal quality.

6. The method according to claim 1, whereby the switching, by the specific mobile device, from the source sidelink to the fallback link to exchange signals with the following mobile device comprises the specific mobile device receiving a command originating from an application server.

7. The method according to claim 1, whereby the switching, by the specific mobile device, from the source sidelink to the fallback link to exchange signals with the following mobile device, comprises the specific mobile device receiving a signal originating from an application server based on a geographical location of the specific mobile device.

8. The method according to claim 1, whereby the switching, by the specific mobile device, from the source sidelink to the fallback link to exchange signals with the following mobile device, comprises the specific mobile device receiving a switching command originating from the source base station.

9. The method according to claim 1, further comprising the specific mobile device exchanging with the following mobile device signals to check if the specific mobile device and the following mobile device are served by a same base station.

10. The method according to claim 1, further comprising, prior to the switching by the specific mobile device from the source sidelink to the fallback link, sending, by the specific mobile device and to the source base station, a signal indicating fallback link scheduling constraints.

11. The method according to claim 1, whereby the switching, by the specific mobile device, from the source sidelink to the fallback link to exchange signals with the following mobile device, is preceded by a fallback link preparation step, the fallback link preparation step comprising sending a fallback link preparation message from the specific mobile device to the following mobile device, the fallback preparation message comprising fallback link configuration information.

12. The method according to claim 1, whereby the specific mobile device periodically proceeds with checking the availability of a fallback link resource.

13. A non-transitory computer-readable storage medium comprising instructions which, when executed by a processor of a specific mobile device, cause the processor to carry out the method according to claim 1.

14. A specific mobile device comprising a processor, a memory and a networking module, the processor being configured to operate according to claim 1.

15. The specific mobile device of claim 14, whereby the networking module is a single radio networking module.

* * * * *